United States Patent [19]
Lally et al.

[11] 3,799,723
[45] Mar. 26, 1974

[54] INJECTION MOLD WITH A SPRUE PLUGGING MECHANISM

[75] Inventors: William Lally; Kenneth L. Moore; John E. Robbins; William F. Willbond, all of Leicester, England

[73] Assignee: USM Corporation, Boston, Mass.

[22] Filed: May 15, 1972

[21] Appl. No.: 253,160

[52] U.S. Cl....... 425/245 R, 425/DIG. 51, 249/121, 425/129
[51] Int. Cl. ............................................. B29c 1/05
[58] Field of Search............ 425/DIG. 51, 129, 132, 425/245; 249/110, 121; 53/43, 324, 319

[56] References Cited
UNITED STATES PATENTS

| | | | |
|---|---|---|---|
| 3,650,654 | 3/1972 | Schwartz | 425/245 X |
| 2,988,779 | 6/1961 | Barton et al. | 425/DIG. 51 |
| 2,319,234 | 5/1943 | Hothersall | 53/43 |
| 3,383,440 | 5/1968 | Chaldekas | 425/4 X |

Primary Examiner—J. Spencer Overholser
Assistant Examiner—David S. Safran
Attorney, Agent, or Firm—Vincent A. White

[57] ABSTRACT

An injection molding machine having mechanism for injecting fluid molding material into an article forming cavity through a sprue bore and a device for inserting a plug into the bore after the molding material is injected.

6 Claims, 10 Drawing Figures

PATENTED MAR 26 1974 3,799,723

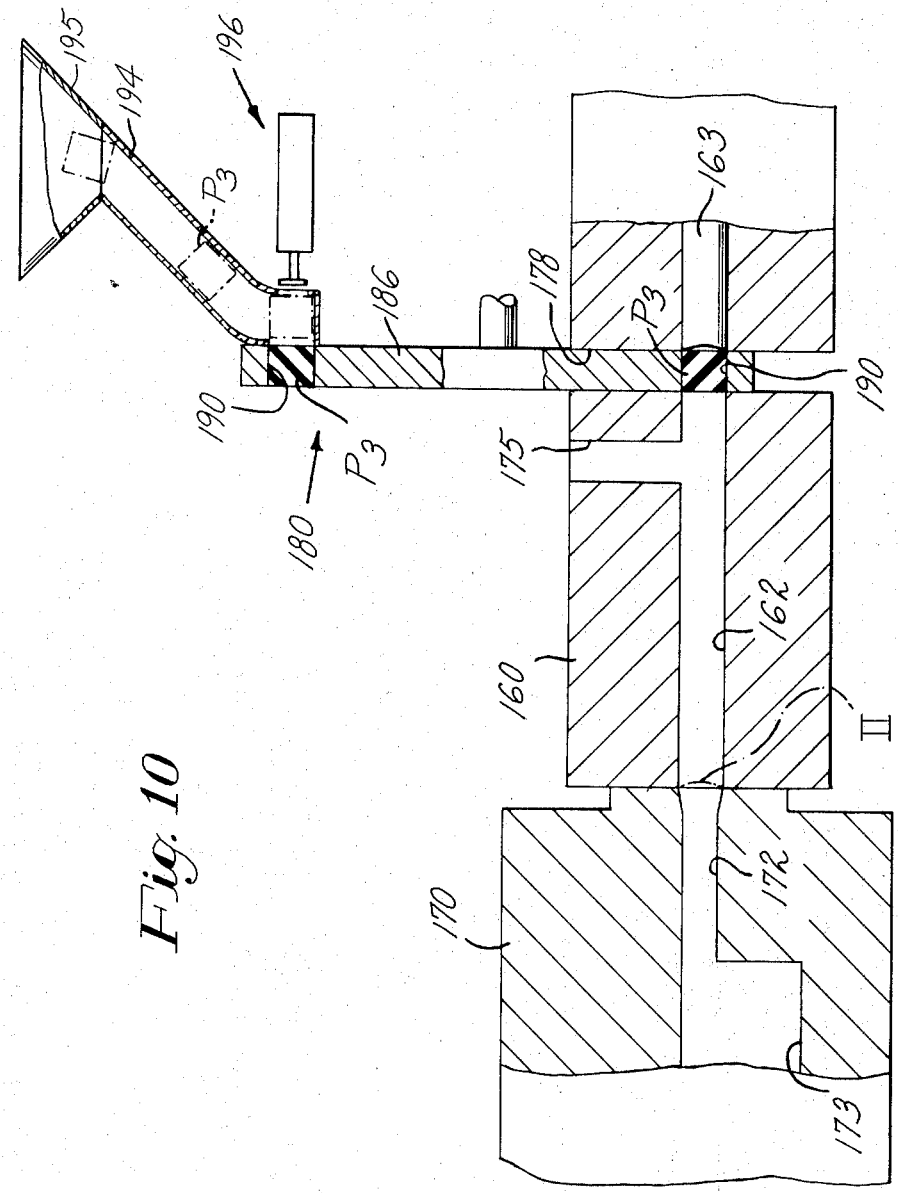

INJECTION MOLD WITH A SPRUE PLUGGING MECHANISM

BACKGROUND OF THE INVENTION

Injection molding in general utilizes injection mechanism adapted to dispense molding material in fluid condition, and a mold assembly adapted to provide a mold cavity in the form of the article to be molded. With the injection mechanism and mold assembly in operative association, molding material is injected from the injection mechanism along an injection passage thereof into the mold cavity through a sprue bore of the mold assembly. According to usual practice, the mold material is allowed to solidify in the mold cavity whereupon the mold assembly is opened and the molded article is removed.

For certain reasons, it is desirable to remove the mold assembly and injection mechanism from operative association immediately after injection from the injection passage has been completed. For example, to ensure high utilization of injection mechanism, it may be desirable to use a plurality of mold assemblies and to fill the mold cavity of each in turn. However, in certain circumstances difficulties are encountered. For example, if the mold material particularly fluid, such as are certain polyurethane-forming mixtures, and/or if upon injection into the mold cavity expansion of the molding material occurs (such as in the production of articles of a cellular nature) there is a tendency for molding material to leak backwardly from the sprue bore. This disadvantage when encountered has heretofore been obviated by the provision on the mold assemblies of gating mechanism adapted to close the sprue bore on completion of injection thereinto of molding material. This manner of obviating the disadvantage is complex, and expensive in that it adds considerably to mold costs.

OBJECTS OF THE INVENTION

Accordingly, the invention provides an injection molding machine which overcomes the above objections. The machines may have at least one mold assembly adapted to provide a mold cavity with a sprue bore extending to the cavity. An injection mechanism is adapted to dispense a fluid molding material along an injection passage thereof and to inject such fluid material along the sprue bore into the mold cavity while the mold assembly and the injection mechanism are in operative association. So the injection mechanism may be separated from the mold shortly after the mold is filled, means are provided to insert a plug into the sprue bore while the mold assembly and the injection mechanism are still in operative association.

Preferably, the sprue plug may be formed in the machine, such as, by the molding of the plug from material previously dispensed from the injection mechanism. For example, the plug may be formed by mechanism movable between a first condition in which it provides a first intermediate passageway communicating with the injection passage and the sprue bore, and a second condition in which it provides a second intermediate passageway communicating with the injection passage and the sprue bore, wherein in the use of the machine during the dispensing of molding material from the injection mechanism the material flows into the first intermediate passageway and along the sprue bore into the mold cavity. Upon completion of injection into the mold cavity the mechanism is moved to its second condition so the second intermediate passageway replaces the first, and a plug of relatively solid molding material is moved from the second intermediate passageway into the sprue bore. Molding material remaining in the first intermediate passageway solidifies therein to be used in the closure of the same or another sprue bore in a subsequent molding operation.

The mechanism advantageously may also have a multiplicity of intermediate passageways whereby adequate time is allowed for the solidification of molding material therein before said material is ejected therefrom as a sprue plug.

In another embodiment, the sprue plugs may be fed to the machine pre-formed, said sprue closure mechanism being operative to position one sprue plug at a time for insertion. Conveniently, the sprue plug may be positioned in the injection passage upstream of an entry port extending thereinto, with means being provided to move the sprue plug along the injection passage and into the sprue bore. Alternatively, the sprue plugs may be formed by the machine in the upstream passage and may include a purging member movable to complete injection of molding material from the injection mechanism by the ejecting of residual molding material from the injection passage into the sprue bore.

According to another embodiment, the sprue closure mechanism may comprise means to advance a continuous ribbon of plug material of uniform thickness between the injection passage and the sprue bore of the mold assembly when in operative association with the injection mechanism. The purging member, on further movement subsequent to completion of injection is moved further toward the sprue bore, punching a sprug plug from the ribbon and inserting the plug in the sprue bore. During a subsequent molding operation the hole in the ribbon provides an intermediate passageway communicating with the injection passage and the sprue bore through which intermediate passageway molding material is injected into the sprue bore. On completion of dispensing of molding material from the injection mechanism, the purging member advances to a position adjacent said hold, ejecting residual material from the injection passage into the sprue bore, whereupon the ribbon is advanced, and on further movement of the purging member a further sprue plug is punched from the ribbon.

Alternatively, the sprue closure mechanism may comprise a plurality of passageways each capable of providing, in turn, an intermediate passageway communicating with the injection passage and the sprue passage of a mold assembly operatively associated with the injection mechanism. When in the use of the machine a first of a plurality of said mold assemblies is operatively associated with the injection mechanism and a first of the passageways of the sprue closure mechanism is brought into a position communicating with the injection passage and the sprue passage of said assembly, fluid molding material is dispensed from the injection mechanism along the injection passage, along the intermediate passageway, along the sprue passage and into the mold cavity. On completion of injection, the sprue closure mechanism is moved to bring another passageway thereof between the injection passage and the sprue passage, a sprue plug located in said other passageway being thereby positioned in a manner such that, on further movement of the purging member, the plug is inserted into the sprue bore, molding material remaining in the first said passageway solidifying therein to provide a sprue plug to be used in the closure of the sprue bore of a subsequent mold assembly.

The above and other of various objects and several features of this invention will become clear from the following description, to be read with reference to the accompanying drawings, of four alternative embodiments of the invention. It will be appreciated that these embodiments have been selected to illustrate the invention by way of example only, and not by way of limitation thereof with various substitutions of equivalent mechanisms being possible without departing from the scope of the invention.

DESCRIPTION OF THE DRAWINGS

FIG. 10 is a schematic sectional view of a fourth illustrative embodiment.

PREFERRED EMBODIMENT OF THE INVENTION

Figure 1:
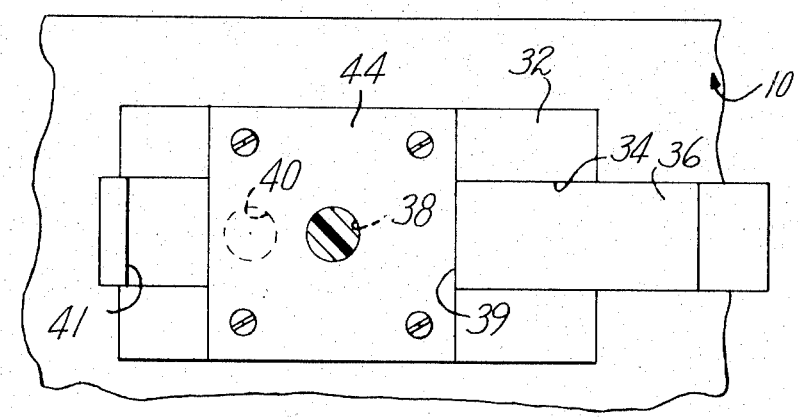
FIG. 1 is a schematic front view of part of an injection mechanism.

The four illustrative machines each may have a plurality of mold assemblies (only part of one assembly being shown) each adapted to provide a mold cavity and a sprue bore extending to the cavity. A typical injection mechanism may be adapted to mix constituents of a typical polyurethane composition in a mixing chamber and to dispense fluid molding material, from the mixing chamber and along an injection passage. Mounted in the injection passage for movement lengthwise thereof, a purging member may be provided to eject residual molding material from the injection passage to complete an injection operation of the injection mechanism.

In the use of all four illustrative embodiments, each mold assembly is brought into operative association with the injection mechanism by indexing mechanism of the machine, (not shown) whereupon an injection operation takes place and fluid molding material dispensed from the injection mechanism flows from the injection passage, along the sprue bore of the mold assembly and into the mold cavity thereof. On completion of said injection operation, a sprue plug, aligned with the sprue, is inserted into the sprue bore while the mold assembly and the injection mechanism remain in operative association. The sprue plug is effective to prevent leakage from the mold cavity and the sprue bore. Such leakage would provide on solidification a residue of molding material which would have to be removed from the mold assembly and which might, due to the depletion of molding material from the mold cavity, result in the production of an incomplete molded article.

Subsequent to the removal of the mold assembly and injection mechanism from operative association, the sprue plug may be moved by automatic mechanism of the machine further into the sprue bore, or may, after elapse of a period of time sufficient to allow adequate solidification of the molding material in the sprue bore, be removed from the sprue bore. In general, however, it is preferred that the sprue plug remains in its inserted position, in which position it adheres to the molding material and is removed with the sprue on removal of the article from the mold cavity.

The injection mechanism of the first illustrative embodiment (see FIGS. 1 to 4) comprises an injection head 10, and the mold assemblies 20, (only past of one assembly being shown), each adapted to provide a mold cavity in which an article is to be formed. The injection mechanism has an injection passage 12 which receives a close fitting purging member 13. The mold assembly has a sprue bore 22 similar in cross-section to the passage 12 and preferably is tapered from, at its opening, a size equal to that of the injection passage 12, to a smaller size.

Figure 2:
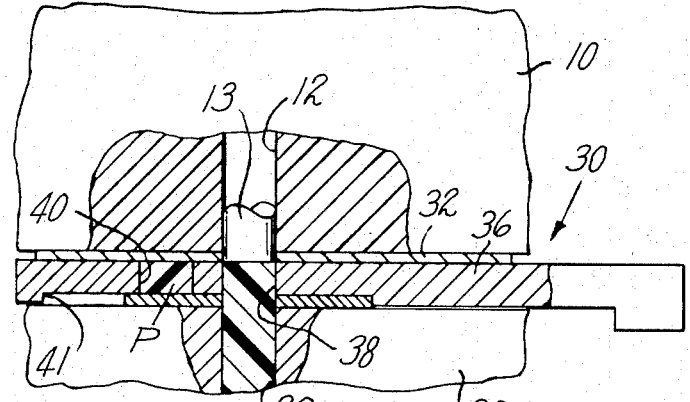
FIGS. 2, 3 and 4 are schematic sectional views of part of the machine showing various stages of operation of the machine.
Figure 3:
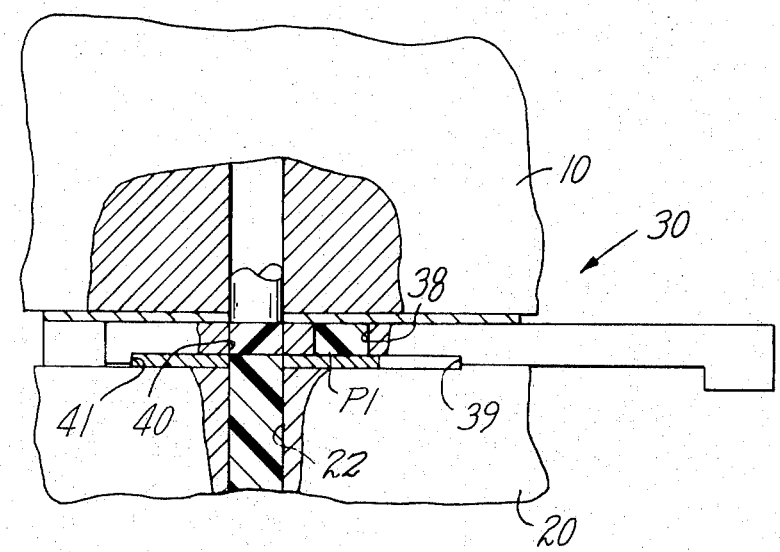
Figure 4:
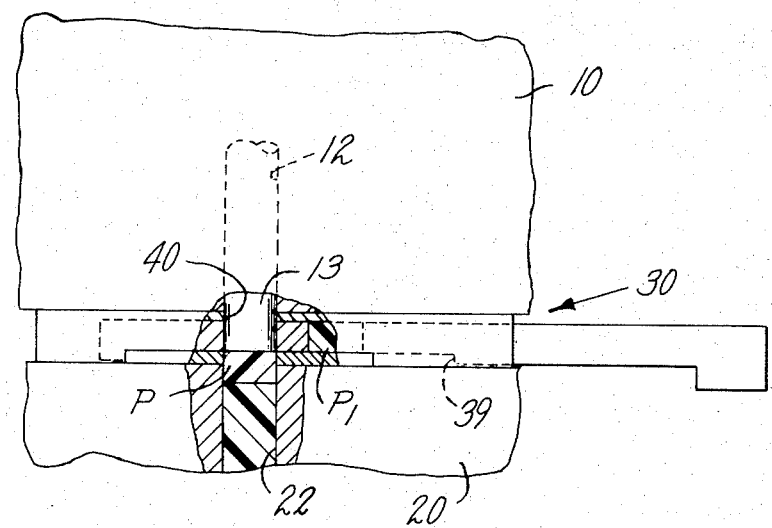
Figure 5:
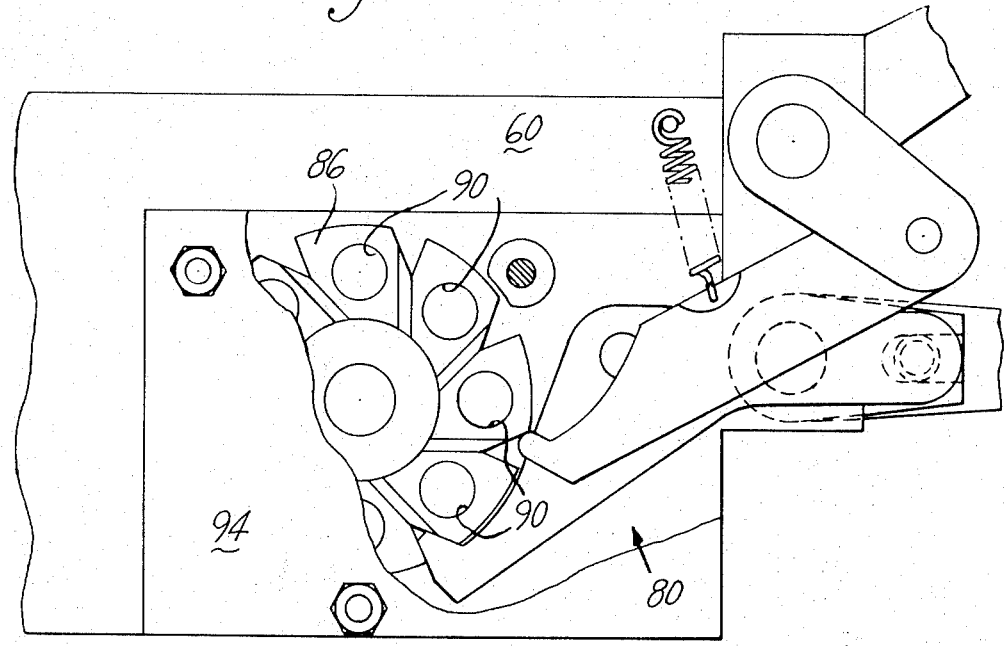
FIG. 5 is a schematic front view of part of sprue closure mechanism of an alternate embodiment of the invention.
Figure 6:
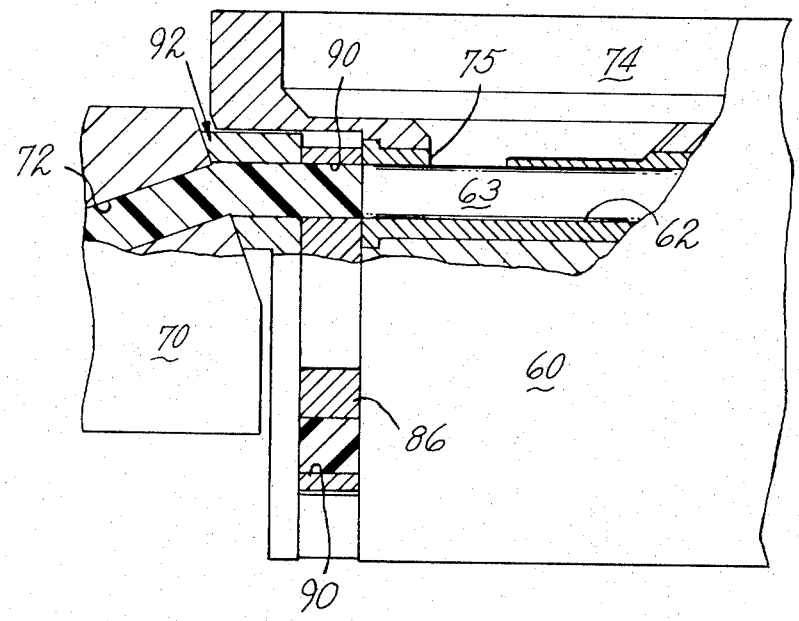
FIGS. 6, 7 and 8 are schematic sectional views of part of the embodiment of FIG. 5 showing various stages of operation.
Figure 7:
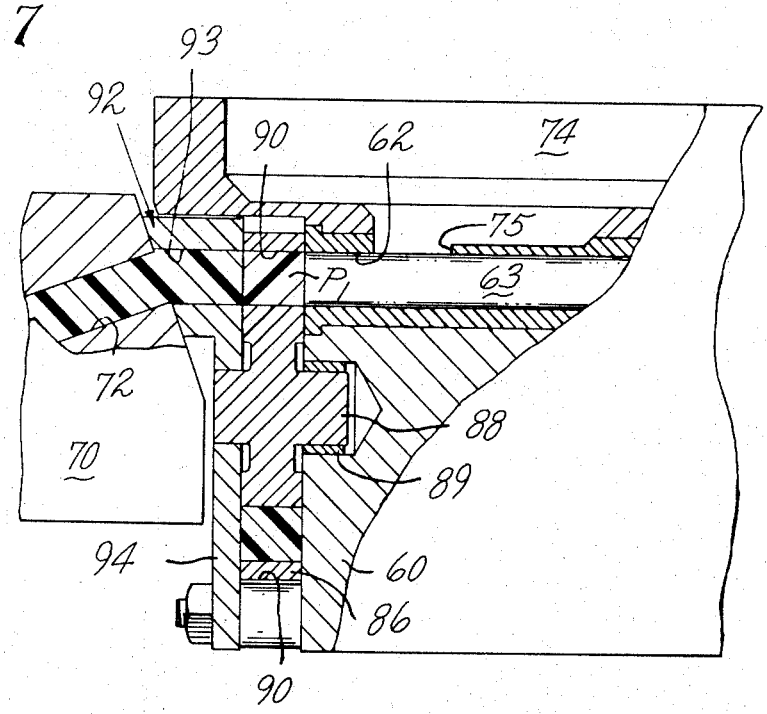
Figure 8:
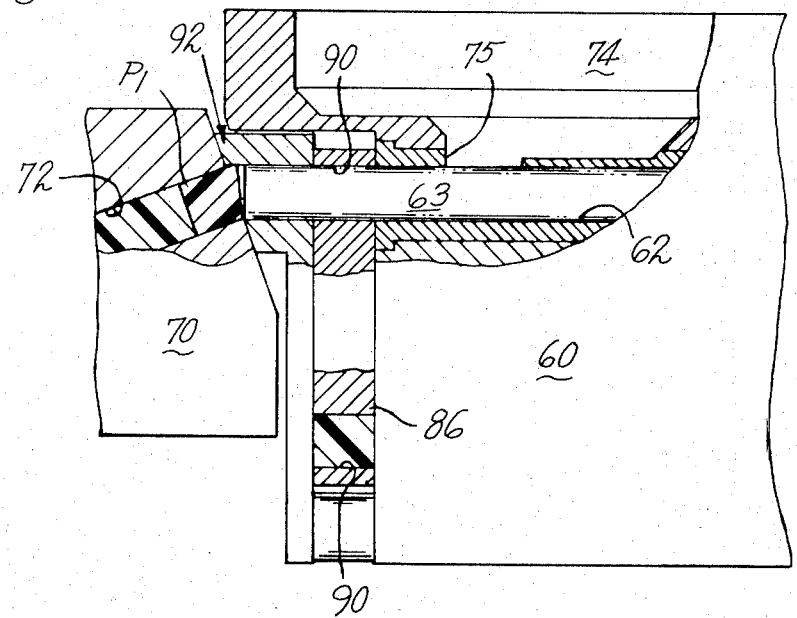

The injection head 10 is provided with a sprue closure mechanism 30 comprising a base plate 32 secured to the heat 10, a guideway 34 provided by a slot in the base plate, a slide member 36 slidably mounted in the guideway 34 and a front plate 44 fixed to the base plate 32 to secure the slide member 36 in the guideway 34. The slide member 36 has first and second circular apertures 38 and 40, respectively, each of a cross-section equal to that of the injection passage. The slide is movable within the guideway 34 between a first position in which the first aperture 38 is aligned with the injection passage 12, (see FIG. 2) and a second position in which the second aperture 40 is aligned with the injection passage, (see FIG. 3). The first position is determined by movement of the slide member to the left (as shown in FIG. 2) until a shoulder 39 engages the front plate 44, and the second position is determined by movement of the slide member to the right until a shoulder 41 engages the front plate. When the mold assembly 20 and the injection mechanism are in operative association, the aperture 38, of the slide 36, in its first position (FIG. 2), provides a first intermediate passageway communicating with both the injection passage 12 and the sprue bore 22. When in its second position, the aperture 40 of the slide provides a second intermediate passageway communicating with both the injection passage 12 and the sprue bore 22. Thus, the sprue closure mechanism 30 provides means to form a sprue plug by molding, and to position such plug in alignment with the sprue bore for insertion before the mold assembly is separated from the injection mechanism, the purging member 13 providing the means to insert the sprue plug on completion of injection of molding material into the mold cavity.

In the usual operation of the dispensing mechanism the purging member 13 is retracted beyond an intermediate conduit extending between a mixing chamber and the injection passage 12 to a first position (not shown) and molding material is dispensed from the mixing chamber, along the intermediate conduit, along the injection passage 12, through the first intermediate passageway (provided by the aperture 38) along the sprue bore 22 and into the mold cavity. On completion of the dispensing of molding material from the mixing chamber, the purging member 13 advances to a second position (as shown in FIG. 2) ejecting residual molding material from the injection passage 12 to complete the injection of molding material from the injection mechanism. The slide 36 is then moved by automatic means of the machine to its second position moving the aperture 40 into alignment with the injection passage and the sprue bore and a sprue plug P therein into a position adjacent the sprue bore 22, (see FIG. 3). Further movement of the purging member 13 caused by said automatic means inserts the sprue plug P into the sprue bore 22, (see FIG. 4).

Although a major part of the material dispensed from the injection mechanism is injected into the sprue bore 22, part thereof remains in the aperture 38 to mold another sprue plug P1. On further use of the illustrative machine, with another mold assembly in operative association with the injection mechanism a further quantity of molding material is dispensed along the injection passage 12 through the second intermediate passageway provided by the aperture 40 into the mold cavity of the mold assembly. The material in the aperture 38 is at least partially solid, and on movement of the slide 36 back to its first position by said automatic means, is aligned with the sprue bore to provide said sprue plug P1 to be inserted into said sprue bore on further movement of the purging member 13.

The second embodiment of the invention to be described (see FIGS. 5–8), comprises an injection head 60, and the mold assemblies 70, (part of only one mold assembly being shown), are each adapted to provide a mold cavity. The injection head is provided with an injection passage 62 which receives a closely fitted valve rod and purging member 63. The head is also provided with an intermediate conduit 75 extending between a mixing chamber 74 and the injection passage 62.

Mounted on the injection head 60 is a sprue closure mechanism 80 comprising a generally circular member 86 having an integral shaft 88 secured in a sleeved bore 89. A front plate 94 secured to the head 60 holds the circular member 86 in a position bearing against the head with the shaft 88 in the bore 89. An upper portion of the front plate 94 provides a nozzle 92 of the injection mechanism comprising an outlet passage 93 coaxial with and of the same diameter as the injection passage 62. The circular member 86 has a plurality of circumferentially spaced circular apertures 90, each of a cross-section equal to that of the injection passage.

A sprue bore 72 of the mold assembly 70 extends to the mold cavity and is also of circular cross-section, and may preferably be tapered from injection passage 62. When the mold assembly 70 and the injection mechanism are in operative association, the sprue bore 72 is aligned with the outlet passage 93. The circular member 86 is rotatable to align each of the apertures 90 alternately with the injection passage 62 and (by way of the outlet passage 93) in communication with the sprue bore 72.

The sprue closure mechanism 80 provides means to form a sprue plug by molding, and to position the plug for insertion into the sprue bore 72 of the mold assembly while the mold assembly remains in operative association with the injection mechanism. The purging member 63 provides means for inserting the plug into the sprue bore on completion of injection of molding material and before separation of the injection mechanism and the mold assembly. With the closure mechanism 80 in an initial condition, and the mold assembly in position for receiving molding material, the purging member 63 is retracted beyond the intermediate conduit 75 and molding material is dispensed from the mixing chamber 74, along the intermediate conduit 75, along the injection passage 62, through the first intermediate passageway (provided by the first aperture 90), along the outlet passage 93, along the sprue bore 72 and into the mold cavity. On completion of dispensing of molding material from the mixing chamber, the purging member 63 is advanced to the position shown in FIG. 6, ejecting residual molding material from the passage 62 to complete the injection of molding material. Arrival of the purging member at this position, triggers automatic means (part of which is shown schematically in FIG. 5) to rotate the member 86 to move a second aperture 90 into alignment with the injection passage and, by way of the outlet passage 93, into alignment with the entrance of the sprue bore 72, (see FIG. 7). The automatic operating means causes further movement of the purging member 63 to a position shown in FIG. 8 whereby a previously formed plug P1 is moved from the second aperture 90 along the outlet passage 93 and into the sprue bore 72. Molding material retained within the first aperture solidifies therein, to be used to close the sprue bore of a subsequent mold assembly.

Figure 9:
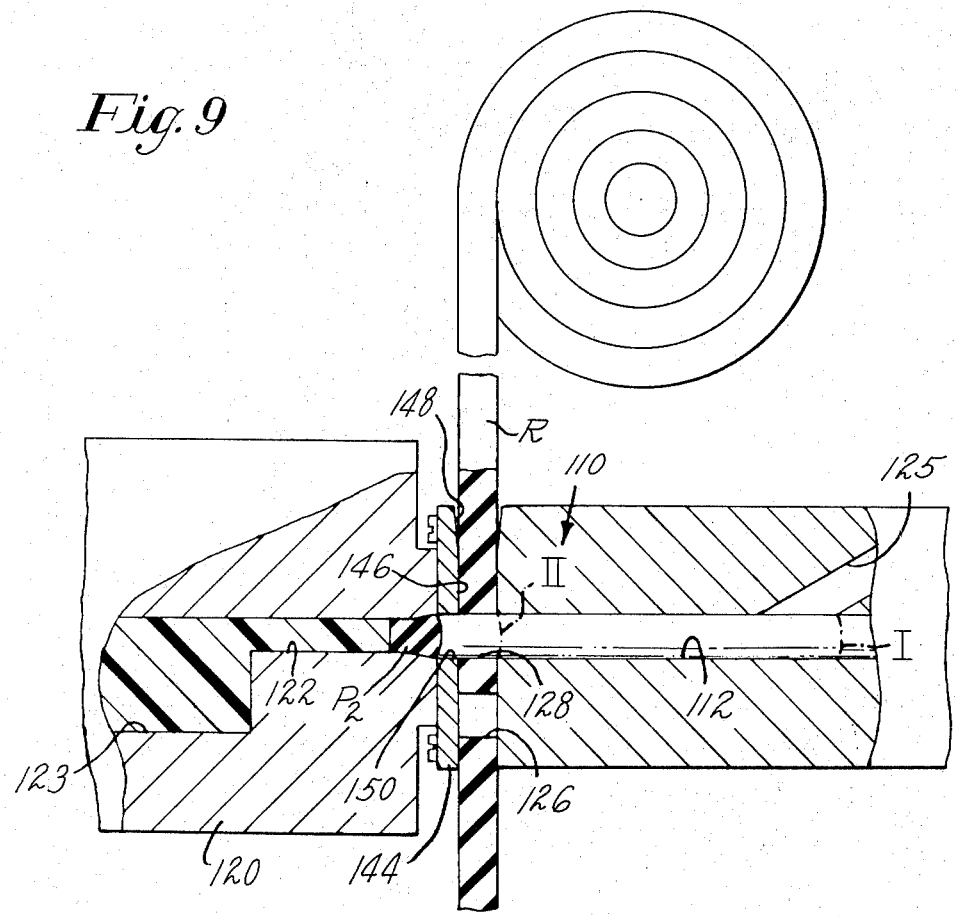
FIG. 9 is a schematic sectional view of another alternate embodiment of the invention.

The injection mechanism of a third embodiment, shown in FIG. 9 comprises an injection head 110 and mold assemblies 120 (only one being shown) each providing a mold cavity 123. An injection passage 112 is provided in the head 110 and extends from an intermediate conduit 125 leading from a mixing chamber, (not shown), and receives a close-fitting purging member 113. Mounted on the injection head is a front plate 144 forming a channel 146 extending vertically across the outlet of the injection passage 112. An upper end portion 148 of the channel 146 is flared outwardly and the front plate is provided with a circular aperture 150 of the same diameter as, and coaxial with, the injection passage 112. A sprue bore 122 of the mold assembly 120 is also circular in cross-section and is tapered from, a size equal to that of the injection passage 112 inwardly to a smaller size. When the mold assembly 120 and the injection mechanism are in operative association, the outlet of the injection passage 112, the aperture 150 and the opening of the sprue bore 112 are in line.

A continuous ribbon R of resilient, expanded plastics material or the like is fed automatically along the channel 146 between the aperture 150 and the passage 112. During a previous cycle of operations an opening 126 was punched in the ribbon providing an intermediate passageway communicating with the passage 112 and, by way of the aperture 150, with the sprue bore 122. The purging member 113 is retracted to the position I (FIG. 9) so that molding material is dispensed along the intermediate conduit 125 and the injection passage 112, through the hole 126 in the ribbon, through the aperture 150 and along the sprue bore 122 into the mold cavity 123. On completion of the dispensing of molding material, the purging member 113 is advanced to a second position, (shown in chain dot and indicated II in FIG. 9), ejecting residual molding material from the injection passage 112 to complete the injection of molding material from the injection mechanism.

Automatic means of the machine, responsive to movement of the purging member to its second position, causes the ribbon R to be advanced across the aperture 150. The purging member 113 is advanced to a third position, (shown in FIG. 9), punching a sprue plug P2 from the ribbon and inserting the plug into the sprue bore 122, leaving a hole 128 in the ribbon. The hole 128 provides a passageway on retraction of the purging member to its first position through which molding material is injected into the mold cavity of the next following mold assembly.

The injection mechanism of the fourth embodiment shown in FIG. 10 comprises an injection head 160 and mold assemblies 170 each adapted to provide a mold cavity 173. An injection passage 162 in the head 160 receives a purging member 163 with a close fit for sliding movement. Extending from a mixing chamber (not shown) to the injection passage is an intermediate conduit 175. The injection head 160 is provided with a slot 178 extending across the injection passage 162 immediately behind the conduit 175. A circular member 186 of a sprue closure mechanism 180 of the illustrative machine is rotatably mounted on the injection mechanism with a lower part thereof extending into a slot 178.

The member 186 is provided with a plurality of (eight) circumferentially-spaced apertures 190, each of a diameter equal to that of the injection passage. The member 186 is so mounted that, by rotation thereof, each aperture may in turn be moved into a position coaxial with the injection passage. The sprue closure mechanism further comprises a raceway 194 along which sprue plugs P3 slide from a hopper 195 to a position adjacent an upper portion of the circular member. An outlet of the raceway is so positioned that when one of the apertures 190 is in alignment with the injection passage, a sprue plug may be moved, by loading mechanism 196, into the diametrically opposite aperture. A sprue bore 172 of the mold assembly is circular in cross-section, and tapers inwardly from the injection passage.

In the use of the fourth embodiment, the mold assembly and the injection mechanism are brought into operative association and the purging member 163 is moved to a first position (shown in full lines in FIG. 10) beyond the conduit 175 and beyond the slot 178. The circular member 186 is rotated to move a sprue plug P3 into alignment with the injection passage, and molding material is dispensed from the injection mechanism along the intermediate conduit 175, along the injection passage 162, along the sprue bore 172 and into the mold cavity 173. On completion of dispensing of molding material from the mixing chamber, the purging member 163 advances from its first position to a second position, (shown in chain-dot lines and indicated II in FIG. 10), ejecting molding material from the injection passage 162 and inserting the plug P3 into the sprue bore. When the purging member 163 is returned to its first position, automatic means (not shown) of the illustrative machine causes another plug to be moved into the injection passage, and another plug to be moved by the mechanism 196 into an empty aperture 190. As an alternative to the circular member 186, a slide member mounted for linear movement across the injection passage may be used, such slide member could have only one aperture and be movable from a position in which the aperture is presented to loading mechanism for insertion of a plug to a position in which the aperture is in alignment with the injection passage and the sprue plug is positioned in the injection passage.

Having thus described our invention what we claim as new and desire to secure as Letters Patent of the United States is:

1. In an injection molding machine having a mechanism adapted to inject fluid molding material through a sprue bore into an article forming cavity of a mold assembly, a valve rod movable toward said bore to stop the flow of material from said mechanism, and means for locating a plug between said rod and said bore, and means for causing said rod to insert said plug into said bore after stoppage of said material and locating of said plug between said rod and said bore.

2. In an injection molding machine having a mechanism adapted to inject fluid molding material through a sprue bore into an article forming cavity of a mold assembly, the improvement comprising means for inserting a plug into the sprue bore after said material is injected into said cavity, means for forming a plug for insertion including a member having at least two passages, means for operating said member alternately to align one of said passages with said bore to permit material to be injected into said cavity while the other of said passages occupies a closed condition, said member being operable on completion of the injection of material into said cavity to reverse the alignment of said passages whereby material remaining in said one cavity solidifies when the passage is in its closed condition and the solidified material remaining in the other passage from a previous cycle forms a plug aligned for insertion in said bore.

3. A machine according to claim 2 in which said member comprises a rotatable disk having a plurality of passages each movable successively into and out of alignment with said bore during successive cycles of operation of the machines.

4. A machine according to claim 2 in which said member comprises a slide movable between two alternate positions.

5. In an injection molding machine having a mechanism adapted to inject fluid molding material through a sprue bore into an article forming cavity of a mold assembly, a valve rod movable toward said bore to stop the flow of material from said mechanism, means for locating a plug between said rod and said bore whereby continued movement of the rod after stoppage of said material inserts the plug in said bore, said plug locating means comprising a ribbon of material from which a plug is punched and inserted in the bore by the continued movement of said rod.

6. A machine according to claim 5 in which the opening in the ribbon formed by punching and insertion of the plug in one cycle of the machine permits passage of fluid material during the next injection cycle and means are provided to move the ribbon at the end of the next injection cycle to present an unbroken portion of the ribbon for the punching and insertion of a plug by said rod.

* * * * *